M. J. MAGUTH.
AUTOMOBILE BUMPER.
APPLICATION FILED AUG. 7, 1915.
1,194,405.
Patented Aug. 15, 1916.
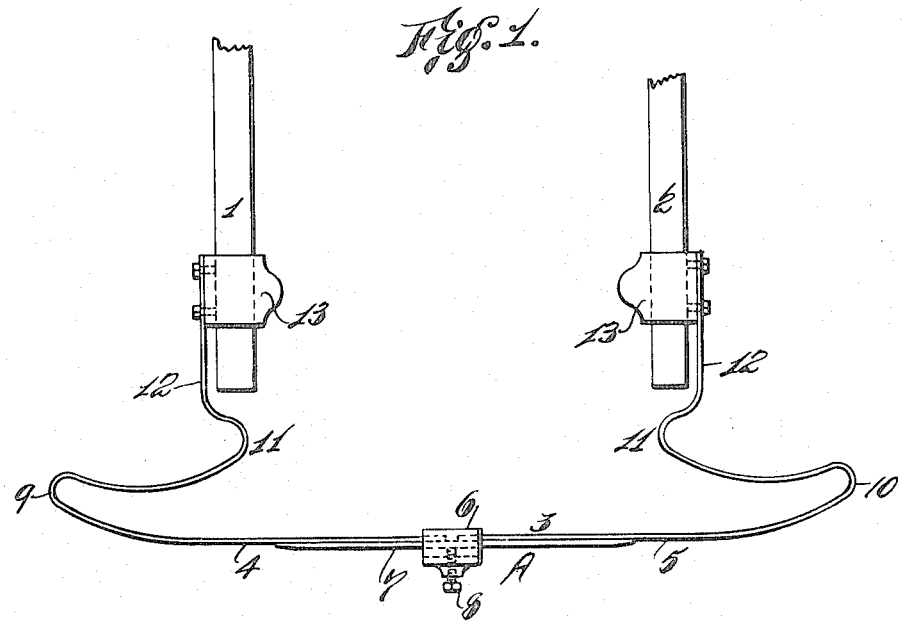
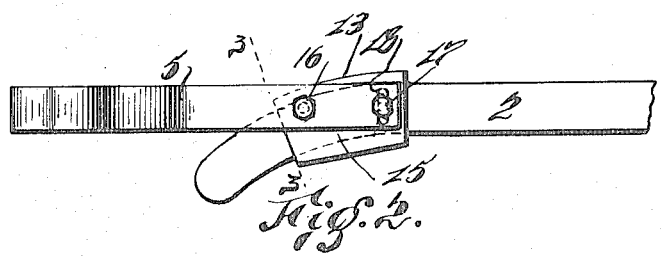
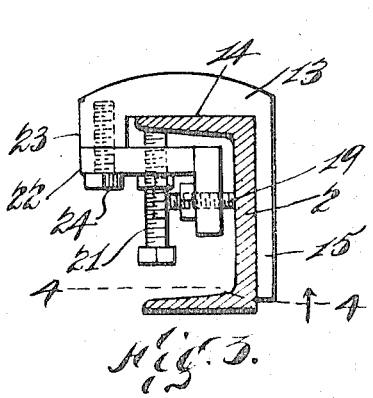
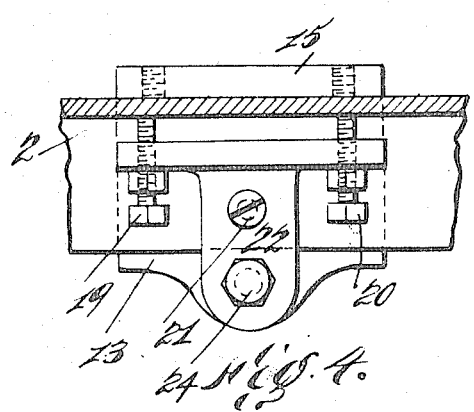

UNITED STATES PATENT OFFICE.

MICHAEL J. MAGUTH, OF CARLSTADT, NEW JERSEY.

AUTOMOBILE-BUMPER.

1,194,405.　　　　　Specification of Letters Patent.　　Patented Aug. 15, 1916.

Application filed August 7, 1915. Serial No. 44,191.

*To all whom it may concern:*

Be it known that I, MICHAEL J. MAGUTH, a citizen of the United States, residing at Carlstadt, county of Bergen, State of New Jersey, have invented certain new and useful Improvements in Automobile-Bumpers, of which the following is a full, clear, and exact description.

This invention relates to an improvement in automobile bumpers, the object being to provide a bumper that will yield to the shock of contact with another vehicle or other object. By providing a yieldable bumper, the lamps, radiator or any other parts of a motor vehicle will be protected against injury far more than if a non-yieldable bumper is used, for the reason that the yieldable bumper will give, or bend, when struck, thereby acting as a shock-absorber to prevent a large amount of jarring to the vehicle.

I will now proceed to describe my invention in detail, the essential features of which will be summarized in the appended claims, reference being had to the accompanying drawing, forming part hereof; wherein Figure 1 is a plan view of the front end of the chassis of a motor vehicle equipped with my improved bumper; Fig. 2 is a side view thereof; Fig. 3 is an enlarged sectional view, the section being taken on a line 3—3 in Fig. 2; and Fig. 4 is an enlarged sectional bottom plan view, the section being taken on a line 4—4 in Fig. 3.

Referring to the drawing the side members of the chassis of a motor vehicle are indicated by 1 and 2 to which is secured my improved bumper 3. My improved bumper consists of, in this instance, two yieldable members 4 and 5 secured together by a clamp 6, a plate 7 being employed to stiffen the said bumper. The plate 7 is in the form of the leaf of a spring and is itself yieldable. As many plates 7 may be used as desirable. The clamp 6 carries a binding screw 8 to secure the bumper members together.

To increase the yieldability of the bumper, especially at its bent over ends 9 and 10, I form an ogee 11 in each bent over portion of the members 4 and 5. Should the bumper ends 9 or 10 strike an object or be struck, the ogee portions 11 will, in themselves, yield to the shock as well as the rest of the bumper, hence the breaking of the bumper at the ogee portions is to a large extent prevented, to say nothing of the cushioning effect produced.

The free end 12 of each bumper member is secured to its adjacent chassis member by a special fastening device, which consists of a block having a channel 14 (Fig. 3) to receive the top flange of the chassis frame member. Each block 13 carries a plate member 15 which rests against the web of its chassis or frame member. Each end 12 of each bumper member is secured to the plate 15 of its securing block 13 by bolts 16 and 17 which pass through the ends 12 of the bumper members and engage a plate 15. To permit the bumper to be adjusted vertically at its outer end A, I slot each end member 12 as at 18, Fig. 2, the bolt 16 acting as the pivot point. After the bumper has been adjusted, the bolts 16 and 17 will be tightened to rigidly secure the bumper.

To secure the blocks 13 in position, I provide jam-bolts 19, 20 and 21, Figs. 3 and 4, which are carried by a bracket 22 which in turn is secured to the flange 23 of the block 13 by a bolt 24. The block 13 is preferably formed to fit the curved end of the frame members, as shown in Fig. 2, to assist in preventing the blocks from sliding back when the bumper is struck. The blocks 13 are formed to accommodate frames of various sizes, that is to say, the channel 14 is wide enough to take the widest frame member in use on motor vehicles. The adjustable jam-bolts 19 and 20 will take care of the various thicknesses of metal. The jam-bolt 21 secures the block to the top flange of its frame-member while the bolts 19 and 20 bind the plate 15, of the block, to the web of its frame-members.

As can be seen in Fig. 1 the bumper members 4 and 5 are held in alinement, with the adjacent ends thereof separated, by the clamp 6. The bumper members 4 and 5 are held with their adjacent ends separated to permit of a certain amount of end movement when the bumper is sprung by a blow applied at the ends thereof or in the center. One of the features of providing the bumper-members with the ogee portions is to permit the said bumper to spring, should the ends thereof be struck while the vehicle is being backed. If the bumper is struck on either end while the machine is being backed the ogee portions 11 will permit the said bumper to spring to a large extent, while if the ogee portions were not provided the bumper would break or would be liable to break, owing to the lack of yieldability.

Having now described my invention, what I claim and desire to secure by Letters Patent is:

1. A motor-vehicle-bumper comprising a yieldable bar bent over intermediate the ends thereof to form yieldable loops or end-members, the end of each bent over end-member or loop being bent to form an ogee auxiliary loop to act supplementary to the loops at each end of said bumper, the free end of each auxiliary loop being adapted for attachment to a support.

2. A motor-vehicle-bumper, comprising a yieldable bar bent over intermediate the ends thereof to form yieldable loops or end-members, each bent over end of said bumper being formed intermediate its free end and the adjacent looped ends of the bumper into a plurality of reversely directed connected curves thereby providing yieldable portions adapted to act supplementary to the looped ends of the bumper to resist shock.

3. In combination with a motor vehicle bumper, means to secure same to the frame of a vehicle, said means consisting of a block having a channel to receive a frame member, a bracket detachably secured to said block and extending across the channel in said block, a vertically disposed locking screw carried by said bracket to contact with said frame-member, and a plurality of horizontally disposed locking screws also carried by said bracket and arranged to contact with said frame-member.

4. In combination with the chassis of a motor vehicle having channeled frame members, a bumper, a securing means for said bumper consisting of blocks secured to said bumper, each block being provided with a channel to receive the upper flange of a coöperating frame-member of the chassis, a bracket secured to said block, means carried by said bracket to engage the upper flange of the said frame-member, and means also carried by said bracket to engage the web of the aforesaid frame-member.

Signed at New York city, N. Y., this 5 day of August, 1915.

MICHAEL J. MAGUTH.

Witnesses:
EDWARD A. JARVIS,
EDNA E. NATHOM.